Patented Sept. 3, 1940

2,213,655

UNITED STATES PATENT OFFICE 2,213,655

DIAZO-AMINO COMPOSITION

Haymo V. Pfister, Martinsville, N. J., assignor, by mesne assignments, to American Cyanamid Company, New York, N. Y., a corporation of Maine No Drawing. Application February 10, 1938, Serial No. 189,777

7 Claims. (Cl. 260—140)

The invention relates to a composition adapted for the preparation of dyestuffs, to a method for the application of such composition to textile materials, and to materials dyed therewith. More particularly it relates to a stabilized diazo-amino composition combined with a coupling component, and includes correlated improvements and discoveries whereby and wherewith the preparation of dyestuffs and application thereof are enhanced.

It is an object of the invention to provide a composition of matter which, upon suitable development, will form a dyestuff which dyes various textile materials stable and brilliant shades.

A further object of the invention is to provide a stabilized diazo-amino composition which may be admixed with a coupling component and form thereby a stable dyeing composition.

A more specific object of the invention is to provide stabilization of a diazo compound by interacting therewith a soluble aromatic polyamino compound.

Other objects of the invention will in part be obvious and will in part appear hereinafter.

The invention accordingly comprises the dyeing composition possessing the features, properties and relation of constituents, the process for producing such composition, the process for applying the composition to textile material so produced, all of which are exemplified in the following detailed disclosure and the scope of the invention will be indicated in the claims.

It is generally known to those skilled in the art, that there are at present two general methods used for stabilizing diazo compounds for use in producing dyestuffs on the fiber. One of the generally known methods of stabilizing diazo compounds against coupling makes use of inorganic salts; these are known as nitrosamine compounds, and the other, which utilizes organic amino compounds, is known as a diazo-amino compound.

All the heretofore stabilizing agents used for producing diazo-amino compounds have been of the mono-amino type and it has, therefore, been possible to combine only one diazo group with one of the stabilizing agent.

I have discovered that compounds having two or more amino groups, i. e., aromatic polyamino compounds, which combine with two or more diazo groups, produce diazo-amino compounds of low cost, simplicity of manufacture, and well adapted for dyestuff preparation. To be useful as a component in a dyestuff mixture, it is desirable that the diazo-amino compound formed must be quite soluble in the solvents used in their application; should be reasonably stable on storing; must reconvert back to the original diazo in good yield, and must not interfere with the final dyestuff when produced.

In the practice of the invention a stable diazo-amino compound may be produced by interaction between an aromatic polyamino compound containing a solubilizing group, as sulfonic, carboxylic and acetic, with a diazotized amino compound. The diazo groups present in the compound may be respectively similar in number to the amino groups present in the polyamino compound. The diazo-amino compounds so produced may then be admixed in proper proportions with a coupling component, and made into a paste, a solution, or a powder which may subsequently be utilized for application of dyestuffs to fibers or textile materials.

I have found that satisfactory results may be obtained by the use of aromatic polyamino compounds such as p-phenylene diamine, diamino diphenyl, triamino benzene, diamino naphthalene, etc., which have been solubilized and combined with a diazotized amino compound. The composition containing the coupling component may be printed upon textile material by forming a paste with a thickening material, printing, and then suitably developing by means of acid fumes, or by acidification. The compositions show exceptional keeping qualities in paste, solution, or dried form, and the textile material, following printing, may be dried and stored before developing.

When it is desired to produce a powder, the diazo-amino compounds may be salted out of the solution, dried, and then mixed with a coupling component, or such other materials that may be found useful for producing the dyestuff. The herein described diazo-amino compounds are probably represented by the following formula:

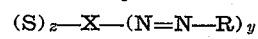

wherein S represents a solubilizing group, as sulfonic, carboxylic, and acetic; X a polyamine residue acting as a connecting member; $z$ and $y$ are whole numbers; and R a residue of a diazotized amine. More specifically, they may be represented as

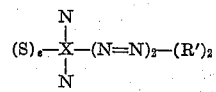

wherein S and $z$ have the same meaning as above, X represents an aromatic diamine residue, and R' a monovalent residue of a diazotized amine.

The following are examples for producing the diazo-amino compounds, the dye producing mixtures, and method of application and use:

Example 1

To 250 grs. of p-phenylene diamine disulfonic acid in solution are added slowly with constant stirring, a solution containing 0.2 mol of neutral diazo solution of 2,5-dichloraniline. If to this solution are added 0.1 mol of diacetoacetic benzidide, caustic soda, and solvent to 800 grs. and a print paste is made containing 10% by weight of the above mixture and printed and developed in the conventional manner, a very beautiful yellow will result.

Example 2

118 grs. triaminobenzene are suspended in water, and add slowly with constant stirring 3 mols monochloracetic acid. Reflux for some time at the boil and add slowly a solution of 3 mols caustic soda. This solution is cooled, and 3 mols sodium acetate are added. To this solution is added a cool neutral diazo solution of 0.3 mol of 1-amino-2-methoxy-4-chlorbenzene with constant stirring and cooling. The mass tends to become somewhat thick, and the diazo must be added slowly and carefully. To this mass is added 0.3 mol of the o-anisidide of 2,3-naphthoic acid, 13 grs. caustic soda, and a mixture of solvents to bring the total solution to 900 grs. If 8 grs. of this solution are printed and developed, a heavy bluish-red results.

It is to be understood that other diazotized amines may be used, such as o-, m- and p-chloranilines, 1,2,4- and 1,2,5-chlortoluidines, and and other nitro-, chlor-, brom- and alkyl-substituted aromatic amines, as anilines, toluidines, xylidines, naphthyl amines anthraquinone amines, diphenyl amines, anisidines, etc.

The coupling components may be such as are usually coupled with diazo compounds, and more particularly may be a naphthol, naphtholates, 2,3-hydroxynaphthoic acid arylides, methyl-phenyl-pyrazolones, acetoacetic acid arylides, 2-hydroxy-carbazole-o-carbonic arylides, 2,4-dihydroxyquinolines, and the like. The proportions of the diazo-amino compound and the coupling component, it will be realized, may be varied within relatively wide limits. However, it is preferred to form an admixture which contains equivalent amounts of the diazo-amino compound and the coupling component.

The coupling component and diazo-amino mixtures, as above indicated, may be stored for relatively long periods of time, and lend themselves readily, when desired, for conversion into dyes for the production of dyeing and prints upon textile materials, particularly cotton and the rayons. Thus, if cotton fibers or cotton fabrics are treated with the diazo-amino coupling component composition and the treated material, developed by subjection to acidifying conditions, or to acidification, the dyes are formed through the splitting of the diazo-amino compound with the formation of the diazo compound which then combines with a coupling component to form the dyestuff. The development of the dye may be effected by placing the treated material or cloth in an ager, and subjecting to steaming with acetic or formic acid vapor for a period of several minutes. The cloth may then be soaped, preferably hot, well rinsed, and dried.

When an ager is not available, the development of the color may be accomplished by passing the material through a warm bath which may contain a mixture of acetic and formic acid and some Glauber salt. The bath is heated and the material remains therein until the full shades are obtained. In addition, the material may be padded with an acid mixture in the usual manner, after which the material is dried, then rinsed, soaped, washed well and again dried. The preparation of the dyestuff in dry form may be brought about also by dissolving the diazo-amino coupling component composition in water, or suitable solvent, together with caustic soda, to give a strongly alkaline reaction. Such a solution, upon acidification, precipitates the dyestuff.

It will be understood from the foregoing, that the production of dyeings yielding bright clear colors which are fast to light, rubbing, kier boiling, and chlorine, may be obtained by merely dissolving the compositions in a solvent containing an alkali, applying the composition to fiber, either as solution by printing or padding, and thereafter splitting off the diazo compound by acidification, which reacts with the coupling component to form the dye.

Since certain changes may be made in the above composition, and in carrying out the above processes for the production of the compositions, and the application thereof to textile materials, without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

This application is a continuation in part of my copending application 30,878 filed July 11, 1935.

What I claim is:

1. As a new product for the production of dyestuffs, a diazo-amino compound of the probable formula:

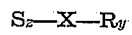

in which S is a solubilizing group, X is an aromatic polyamine residue acting as a connecting member included in the group consisting of mononuclear polyamines, conjugated dinuclear polyamines and dinuclear polyamines having carbon to carbon bonds between the nuclei, R is a diazotized aromatic amine and $z$ and $y$ are whole numbers.

2. As a new product for the production of dyestuffs, a diazoamino compound of the probable formula:

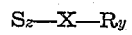

in which S is a solubilizing group, X is an aromatic diamine included in the group consisting of mononuclear polyamines, conjugated dinuclear polyamines and dinuclear polyamines having carbon to carbon bonds between the nuclei, R is a diazotized aromatic amine and $z$ and $y$ are whole numbers.

3. As a new product for the production of dyestuffs, a diazoamino compound of the probable formula:

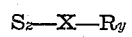

in which S is a solubilizing group included in the group consisting of sulfonic, carboxylic and acetic, X is an aromatic polyamine residue acting as a connecting member included in the group consisting of mononuclear polyamines, conjugated dinuclear polyamines and dinuclear polyamines having carbon to carbon bonds between the nuclei, R is a diazotized aromatic amine and $z$ and $y$ are whole numbers.

4. As a new product for the production of dyestuffs, a diazoamino compound of the probable formula:

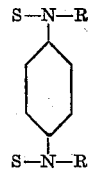

in which S is a solubilizing group and R is a diazotized aromatic amine.

5. As a new product for the production of dyestuffs, a diazoamino compound of the probable formula

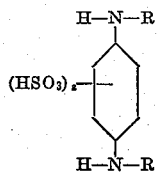

in which R is a diazotized aromatic amine and $z$ is a whole number.

6. As a new product for the production of dyestuffs, a diazoamino compound of the probable formula:

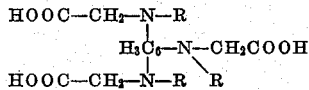

in which R is a diazotized aromatic amine.

7. As a new product for the production of dyestuffs a diazo-amino compound of the formula

in which X is a phenylene diamine compound containing solubilizing groups, R is the residue of a diazotized aromatic amine linked to the phenylene diamine through the amino group.

HAYMO V. PFISTER.